UNITED STATES PATENT OFFICE.

CARL BOSCH, ALWIN MITTASCH, AND CHRISTOPH BECK, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF GERMANY.

MANUFACTURE OF OXIDS OF NITROGEN.

1,207,707. Specification of Letters Patent. Patented Dec. 12, 1916.

No Drawing. Application filed February 25, 1915. Serial No. 10,626.

*To all whom it may concern:*

Be it known that we, CARL BOSCH, ALWIN MITTASCH, and CHRISTOPH BECK, citizens of the German Empire, residing at Ludwigshafen-on-the-Rhine, Germany, have invented new and useful Improvements in the Manufacture of Oxids of Nitrogen, of which the following is a specification.

It is known that oxids of nitrogen are formed by passing a mixture of ammonia and an oxygen-containing gas over a heated catalytic agent consisting of oxids of rare earth metals, but the results obtained by this process are insufficient.

We have now found, that the catalytic oxidation of ammonia with the formation of oxids of nitrogen is effected with excellent results by passing a mixture of ammonia and an oxygen-containing gas, such as air, or oxygen, over a heated catalytic agent containing at least one oxid of a rare earth metal (as to the definition of the group of the rare earth metals, we refer to Meyer, *Zeitschrift für Electrochemie*, vol. 17, page 633) and a compound of bismuth, for example an oxid of bismuth. In addition to these compounds the catalytic agent may contain other substances, for instance, binding agents, but it is preferred to avoid the presence of certain non-metallic elements and of metalloids and compounds thereof, such as phosphoric acid, boric acid and silica, or at any rate large quantities thereof. The production of the catalytic mixtures can advantageously be carried out by precipitating or calcining mixtures of salts of the components, and then forming into suitably shaped pieces, or lumps, and we prefer to employ the catalyst in the form of a layer of small lumps. The proportion of the ingredients can be varied considerably.

The following example will serve to illustrate further the nature of our invention which, however, is not confined to this example. The parts are by weight: Dissolve 30 parts of cerium ammonium nitrate and 3 parts of bismuth nitrate in water and precipitate with ammonia. Dry a part of the precipitate, grind it with 1 part of calcium oxid and then add the remaining damp part of the precipitate and knead the whole well. Then form it into suitably shaped lumps, dry at 250° C., place the mass in a contact tube and heat at about 600° C. Then pass a mixture of ammonia and air through the mass at about 700° C. In this example the cerium ammonium nitrate may be replaced by other cerium salts or by a cerium oxid or, wholly or by parts, by salts or oxids of other rare earth metals, particularly of cerite or yttria earths. Instead of calcium oxid other binding agents such as magnesia and alumina can be used.

Now what we claim is:—

1. The manufacture of oxids of nitrogen by passing a mixture of ammonia and an oxygen-containing gas over a catalytic agent containing at least one oxid of a rare earth metal and a compound of bismuth.

2. The manufacture of oxids of nitrogen by passing a mixture of ammonia and an oxygen-containing gas over a catalytic agent containing at least one oxid of a rare earth metal and an oxid of bismuth.

3. The manufacture of oxids of nitrogen by passing a mixture of ammonia and an oxygen-containing gas through a layer of separate lumps of a heated catalytic agent containing at least one oxid of a rare earth metal and a compound of bismuth.

4. The manufacture of oxids of nitrogen by passing a mixture of ammonia and an oxygen-containing gas through a layer of separate lumps of a heated catalytic agent containing at least one oxid of a rare earth metal and an oxid of bismuth.

5. The manufacture of oxids of nitrogen by passing a mixture of ammonia and an oxygen-containing gas through a layer of separate lumps of a heated catalytic agent containing at least one oxid of cerium and an oxid of bismuth.

In testimony whereof we have hereunto set our hands in the presence of two subscribing witnesses.

CARL BOSCH.
ALWIN MITTASCH.
CHRISTOPH BECK.

Witnesses:
ARTHUR DENONVILLE,
JOHANNES ACHMEL.